(12) United States Patent
Rouffet et al.

(10) Patent No.: US 8,103,281 B2
(45) Date of Patent: Jan. 24, 2012

(54) COMMUNICATION METHOD, BASE STATION, AND USER TERMINAL FOR A WIRELESS COMMUNICATION NETWORK

(75) Inventors: Denis Rouffet, Billancourt (FR); Alistair Urie, Issy-les-Moulineaux (FR)

(73) Assignee: Alcatel Lucent, Paris (FR)

( * ) Notice: Subject to any disclaimer, the term of this patent is extended or adjusted under 35 U.S.C. 154(b) by 1061 days.

(21) Appl. No.: 11/943,389

(22) Filed: Nov. 20, 2007

(65) Prior Publication Data

US 2008/0125132 A1 May 29, 2008

(30) Foreign Application Priority Data

Nov. 24, 2006 (EP) ..................................... 06291825

(51) Int. Cl.
*H04W 40/00* (2009.01)

(52) U.S. Cl. ........ 455/447; 455/450; 455/451; 370/436; 370/294; 370/295

(58) Field of Classification Search .......... 455/436–444, 455/450–453, 447; 370/328–338, 295, 436, 370/478, 480
See application file for complete search history.

(56) References Cited

U.S. PATENT DOCUMENTS

| | | | | |
|---|---|---|---|---|
| 5,506,847 A * | 4/1996 | Shobatake | ..................... | 370/338 |
| 6,023,477 A * | 2/2000 | Dent | ............................. | 370/509 |
| 6,137,787 A | 10/2000 | Chawla et al. | | |
| 6,400,697 B1 * | 6/2002 | Leung et al. | .................. | 370/328 |
| 6,985,736 B1 | 1/2006 | Aalto | | |
| 7,382,743 B1 * | 6/2008 | Rao et al. | ...................... | 370/316 |
| 7,574,179 B2 * | 8/2009 | Barak et al. | .................... | 455/101 |
| 2002/0027890 A1 * | 3/2002 | Bernstein et al. | ............. | 370/331 |
| 2002/0039356 A1 * | 4/2002 | You et al. | ....................... | 370/331 |
| 2002/0058514 A1 * | 5/2002 | Senarath et al. | .............. | 455/450 |
| 2002/0068567 A1 * | 6/2002 | Johansson | ..................... | 455/436 |
| 2003/0152050 A1 * | 8/2003 | Mochizuki | ..................... | 370/332 |
| 2003/0202532 A1 * | 10/2003 | Peelen et al. | ................... | 370/465 |
| 2004/0097238 A1 * | 5/2004 | Hwang et al. | ................. | 455/447 |
| 2005/0096061 A1 * | 5/2005 | Ji et al. | ........................... | 455/450 |
| 2006/0135080 A1 * | 6/2006 | Khandekar et al. | ............. | 455/69 |
| 2006/0268755 A1 * | 11/2006 | Pajukoski et al. | ............. | 370/282 |
| 2007/0177501 A1 * | 8/2007 | Papasakellariou | ............ | 370/229 |

FOREIGN PATENT DOCUMENTS

| | | |
|---|---|---|
| EP | 0782360 A2 | 7/1997 |
| EP | 0986278 A1 | 3/2000 |
| EP | 1418776 A1 | 5/2004 |

OTHER PUBLICATIONS

Halpern S W: "Reuse partitioning in cellular systems" IEEE Vehicular Technology Conference, 1983, pp. 322-327, XP002096008.

* cited by examiner

*Primary Examiner* — Kamran Afshar
*Assistant Examiner* — Marisol Fahnert
(74) *Attorney, Agent, or Firm* — Fay Sharpe LLP

(57) ABSTRACT

The present invention comprises a method for communicating in a wireless communication network (1) comprising a number of cells (2.1, 2.2, 2.3) served by respective base stations (3). According to the proposed method, the following steps are performed: splitting up one at least one of a frequency bandwidth and a time interval allocated to the communication in at least a first part and a second part; using said first part for communication according to a first reuse scheme; and using said second part for communication according to a second reuse scheme.

9 Claims, 5 Drawing Sheets

COMMUNICATION METHOD, BASE STATION, AND USER TERMINAL FOR A WIRELESS COMMUNICATION NETWORK

The invention is based on a priority application EP06291825.5 hereby incorporated by reference.

TECHNICAL FIELD

The present invention relates to a method for communicating in a wireless communication network comprising a number of cells served by respective base stations.

The present invention also relates to a base station and to a user terminal for use in the above-mentioned wireless communication network.

BACKGROUND OF THE INVENTION

For state of the art wireless cellular communication systems, a number of reuse schemes are known either with respect to frequency (in the case of frequency domain modulation) or time (in the case of time domain modulation). For instance, according to a reuse-1 scheme, different signals are transmitted to different network cells or cell regions/sectors using essentially the same frequency. Such an approach is rather complex and suffers for limited performance due to interference issues. Alternatively, known wireless communication systems employ a higher order reuse scheme, e.g., a reuse-3 scheme, in order to circumvent said performance issues. For instance, WiMAX (Worldwide Interoperability for Microwave Access) employs a TDD (time division duplex) reuse-3 scheme. However, such higher order reuse schemes generally suffer from limited spectral efficiency.

SUMMARY OF THE INVENTION

It is the object of the present invention to provide a method of the above-defined type which enables enhanced performance of a wireless cellular communication network in terms of spectral and/or time efficiency. It is also an object of the present invention to provide a base station and a user terminal which can be used in a communication network of the above-mentioned type in order to translate the inventive approach into practice.

According to a first aspect of the present invention the object is achieved by providing a method of the above-defined type, wherein said method comprises the steps of:
  splitting up one at least one of a frequency bandwidth and a time interval allocated to the communication in at least a first part and a second part;
  using said first part for communication according to a first reuse scheme;
  using said second part for communication according to a second reuse scheme.

According to a second aspect of the present invention the object is achieved by providing a base station of the above-defined type, wherein said base station comprises:
  means for splitting up at least one of a frequency bandwidth and a time interval allocated for the communication into at least a first part and a second part;
  means for communicating with a first number of user terminals using said first part according to a first reuse scheme;
  means for communicating with a second number of user terminals using said second part according to a second reuse scheme.

According to a third aspect of the present invention the object is achieved by providing a user terminal of the above-defined type, wherein said user terminal comprises means for transmitting and receiving communication signals over a predefined bandwidth, said bandwidth and/or a time interval allocated to the communication being split into at least two parts, a first part of said two parts being used for communication according to a first reuse scheme, and a second part of said two parts being used for communication according to a second reuse scheme.

In this way, the present invention achieves improved coverage performances. For instance, if a significant part of coverage has a low signal-to-noise ratio (SNR) said part can be covered by a reuse scheme of higher order whereas other parts of the coverage employ a lower order reuse scheme. In the following this will also be referred to as "dual reuse scheme".

In a further embodiment of the present invention said first reuse scheme is a reuse-1 scheme and said second reuse scheme is a reuse-3 scheme, as in standard WiMAX, to improve performance at the critical edges (periphery) of network cells.

As already suggested above, in a further embodiment of the method in accordance with the present invention the latter further comprises covering a first region or sector of a given cell using said first reuse scheme, e.g., reuse-1, and covering a second region or sector of a given cell using said second reuse scheme, e.g., reuse-3. For instance, said first region can be identified with the cell centre, whereas said second region can be identified with the cell edges or periphery. In this way, interference effects are reduced, in particular at the critical cell edges, where increased power or other means have to be used for communication purposes.

Preferably, said first and second cell regions or sectors are not fixed but variable with respect to traffic, shape and size. In this context and in a further embodiment of the method in accordance with the present invention the latter further comprises performing a hand-over of a user terminal between said first and second parts based on at least one transmission-related characteristic, and particular a signal-to-interference plus noise ratio (SINR) or a carrier-to-interference ratio (C/I), wherein said characteristic is determined by the user terminal. In other words, hand-over between one part of the frequency bandwidth or time interval allocated for the communication and another part of said frequency bandwidth or time interval is governed by a set of measurements performed by the user terminal. Since—geographically speaking—said parts are embodied in the form of cell regions or sectors, this effectively leads to first and second cell regions or sectors which are not fixed but variable with respect to shape and size.

In a corresponding embodiment of a user terminal in accordance with the present invention, the latter further comprises means for determining at least one respective transmission-related characteristic for deciding on a hand-over between said first and said second parts.

In order to add efficient broadcast capability for improved spectral efficiency, in a further embodiment of the method in accordance with the present invention the latter comprises using a third part of the bandwidth for broadcast transmission to a number of user terminals. This part of the frequency×time resource is used synchronously by all cells and sectors to transmit the same signal (SFN—single frequency network). Furthermore, this broadcast-only transmission, i.e., synchronised transmission is able to cope with the issue of interferences at the cell periphery The present invention proposes splitting a given resource into a number of independent parts (e.g., three parts) which may comprise a number of "building blocks". For instance, in a pure frequency domain the available bandwidth may be split into five bands, wherein one part (comprising, e.g., one frequency band) is used for point-to-point communication according to a first reuse scheme (e.g., reuse-1), wherein another part (comprising, e.g., three other frequency bands) is used for point-to-point communication according to another reuse scheme (e.g., reuse-3), and wherein the remaining part (i.e. the fifth frequency band) is used for single frequency network broadcast.

If enough frequency bands are available, in accordance with a further embodiment of the method in accordance with the present invention said third part used for broadcast transmission is different, e.g., spectrally distinct from said first and second parts. In other words: Referring to the example given above, single frequency network broadcast takes place on said one frequency which constitutes said third part of the available bandwidth. However, if the number of available frequency bands is limited, as for instance in case of state of the art WiMAX licenses, then in accordance with a further embodiment of the method in accordance with the present invention said third part (or fifth frequency band) may at least partly overlap (i.e., in terms of its spectral location) with at least one of said first and second parts.

In order to keep single carrier demodulation capability for user terminals, i.e., in order to keep user terminals simple and inexpensive, a further embodiment of the method in accordance with the present invention comprises splitting said third part of the bandwidth in at least a first and a second time interval and using said first time interval for paging and interactive communication and said second time interval for broadcast transmission. In this way, some communication is still possible and it is possible to receive a call when receiving broadcasted transmission. No two-carrier capability of the user terminal is required in this context. In particular, by using this approach some voice traffic can easily be handled. For a larger traffic (e.g., data) frequency hopping between different channels or frequency bands can be performed.

The inventive dual reuse scheme can also be applied on a smaller scale to said third part of the available bandwidth, i.e., the part used for broadcast transmission, by:
- splitting up said first time interval into at least a first sub-part and a second sub-part with respect to one of frequency and time;
- using said first sub-part for communication according to a first reuse scheme; and
- using said second sub-part for communication according to a second reuse scheme.

In this way, the dual reuse scheme in accordance with the present invention is effectively reproduced on a smaller scale, i.e., with respect to broadcast transmission.

Further advantages and characteristics of the present invention can be gathered from the following description of preferred embodiments given by way of example only with reference to the enclosed drawings. The features mentioned above as well as below can be used in accordance with the present invention either individually or in conjunction. The described embodiments are not to be regarded as an exhaustive enumeration but rather as examples with respect to a general concept underlying the present invention.

DETAILED DESCRIPTION OF PREFERRED EMBODIMENTS

Figure 1:
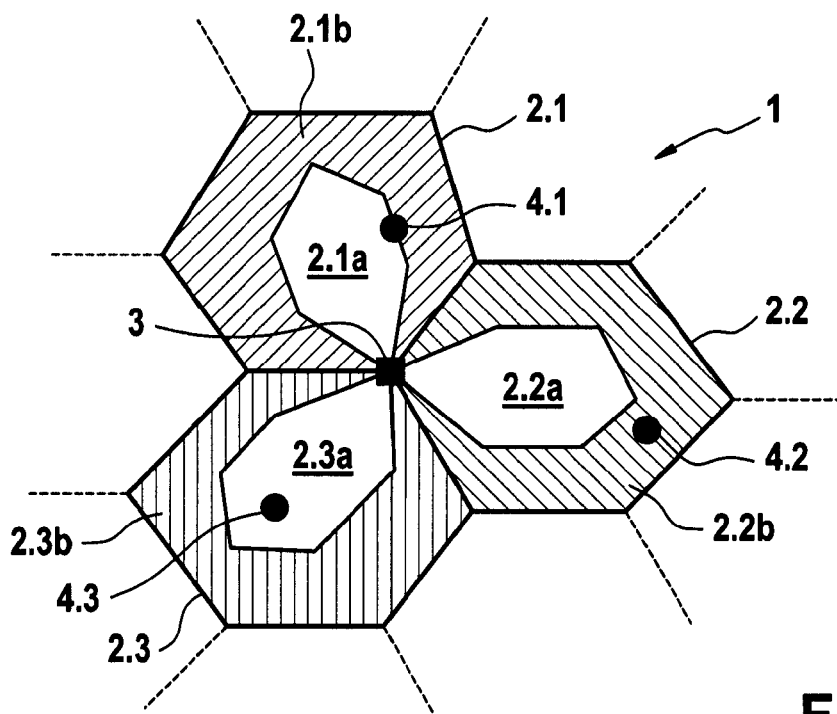
FIG. 1 is a schematic diagram of a wireless cellular communication network which is operated following a method in accordance with the present invention.

FIG. 1 shows a schematic diagram of a wireless cellular communication network which is operated following a method in accordance with the present invention. A wireless communication network 1 comprises a number of cells 2.1, 2.2, 2.3, . . . which are served by respective base stations 3. In the exemplary embodiments of FIG. 1, one base station 3 serves a plurality of adjacent cells 2.1-2.3. However, the present invention is not limited to such a configuration. In particular, each radio cell 2.1-2.3 may be served by its own base station. Furthermore, combinations of these two basic configurations may be realised as well.

Alternatively, cells 2.1-2.3 in FIG. 1 may be regarded as constituting a single network cell together with its associated base station 3. However, throughout the present description the first nomenclature as defined above is used to describe wireless cellular communication network 1.

A number of (mobile) user terminals 4.1, 4.2, 4.3 are located within wireless communication network 1 and use resources of the wireless communication network 1 for communication purposes.

In accordance with the present invention, for increasing performance of the wireless communication network 1, a dual frequency reuse scheme is employed. As can be gathered from FIG. 1 a region which is essentially located in the centre of each network cell 2.1-2.3 is operated according to a first reuse scheme with respect to frequency and/or time, in particular a reuse-1 scheme, for communication with a user terminal, e.g., user terminal 4.3 in case of network cell 2.3. In the schematic diagram of FIG. 1, these regions are labelled by means of reference numerals 2.1a, 2.2a and 2.3a, respectively.

In this context, reuse-1 signifies that the same frequency (or frequency range, i.e., carrier) or time slot is used for communication within regions 2.1a-2.3a. Note that using the same communication frequency (frequency reuse-1) or time slot does not necessarily imply using the same signal in all of said regions 2.1a-2.3a. In fact, reuse-1 implies using different signals in different regions while employing a single communication frequency (frequency range) or time slot.

As will be explained in detail further down, a shape and size of said reuse-1 regions 2.1a-2.3a need not be fixed with respect to the time but may vary in accordance with communication conditions inside network cells 2.1-2.3.

Reuse-1 is preferably used within the central part of network cell 2.1-2.3 owing to lower possible transmit powers, thus limiting interference effects.

As can further be gathered from the illustration of FIG. 1, a different reuse scheme is employed in connection with the peripheral regions 2.1*b*, 2.2*b*, 2.3*b* of network cells 2.1-2.3, respectively. In FIG. 1, this is illustrated by means of different hatchings. In this particular embodiment, a time/frequency reuse-3 scheme is employed in the peripheral regions 2.1*b*-2.3*b* of network cells 2.1-2.3. In other words: Each one of said network cells 2.1-2.3 uses a frequency (frequency range; carrier) or time slot in its respective peripheral region 2.1*b*, 2.2*b*, 2.3*b* which is different from a frequency or time slot used for communication purposes in the peripheral region of any other one of said network cells 2.1-2.3. Since the peripheral region of a given network cell requires enhanced power for communication purposes, this approach effectively limits interference effects.

Hand-over of a user terminal 4.1-4.3 between reuse-1 regions 2.1*a*-2.3*a* and reuse-3 regions 2.1*b*-2.3*b* can be governed by signal-to-interference plus noise ratio (SINR) or carrier-to-interference (C/I) measurements carried out by a respective user terminal 4.1-4.3. This aspect will be explained in some more detail further down and leads to varying shape and/or size of the different regions 2.1*a*-2.3*a*; 2.1*b*-2.3*b* in FIG. 1.

Figure 2A:
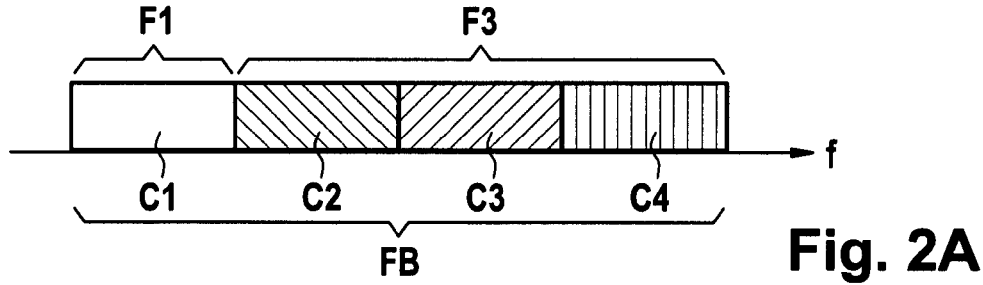
FIG. 2A is a schematic diagram for illustrating a first embodiment of the method in accordance with the present invention in case of frequency domain modulation.
Figure 2B:
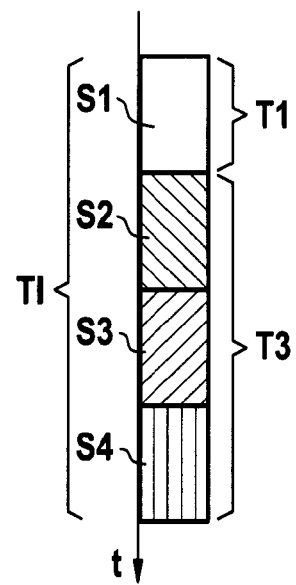
FIG. 2B is a schematic diagram for illustrating a second embodiment of the method in accordance with the present invention in case of time domain modulation.

In accordance with the present invention, joint reuse-1/reuse-3 as an example for the inventive dual reuse scheme can be realised either in the frequency domain (cf. FIG. 2A) or in the time domain (cf. FIG. 2B). However, as will be appreciated by a person skilled in the art the present invention is by no means limited to embodiments with two different reuse schemes.

FIG. 2A shows a schematic diagram for illustrating a first embodiment of the method in accordance with the present invention in case of frequency domain modulation. In FIG. 2A, frequency is denoted f. Hatchings are used in accordance with the diagram of FIG. 1. Referring to FIG. 2A, a frequency bandwidth FB allocated for communication is split into a first part F1 and a second part F3, wherein said first part F1 is used for communication in the central regions 2.1*a*-2.3*a* of FIG. 1, i.e., according to a frequency reuse-1 scheme, and wherein second part F3 is used in the peripheral regions 2.1*b*-2.3*b* of FIG. 1, i.e., according to a frequency reuse-3 scheme. Individual (hatched) blocks C1-C4 in FIG. 2A denote different frequency ranges or carriers.

Referring back to FIG. 1, this means that different frequencies are used within the peripheral regions 2.1*b*-2.3*b* while a common frequency is used within the central regions 2.1*a*-2.3*a*. Communication on all of said frequencies may occur at the same time.

FIG. 2B shows a schematic diagram for illustrating a second embodiment of the method in accordance with the present invention in case of time domain modulation.

In FIG. 2B, time is denoted t. As can be gathered from the schematic diagram of FIG. 2B, a time interval TI allocated to the communication is split up into a first part T1 and a second part T2. As indicated by the different hatchings in FIG. 2B, which correspond to the hatchings used in FIG. 1, said first part T1 is used for communication according to said first reuse scheme within the central regions 2.1*a*-2.3*a* of the communication network 1 in FIG. 1, and the second part T3 is used for communication according to a second reuse scheme within the peripheral regions 2.1*b*-2.3*b* of communication network 1. In other words, during a first (common) time slot S1, which constitutes said first part T1, communication is possible within central regions 2.1*a*-2.3*a*, and during later successive time slots S2-S4, which constitute said second part T3, communication is possible within respective peripheral regions 2.1*b*-2.3*b* of communication network 1.

As described so far, all carriers C1-C4 (in the case of FIG. 2A) and all time slots S1-S4 (in the case of FIG. 2B) are used for classical, i.e., interactive and bidirectional operation.

In order to add broadcasting capability, i.e., synchronous use of a common signal in different spots or regions of the communication network, further embodiments of the present invention may be applied.

Figure 3:
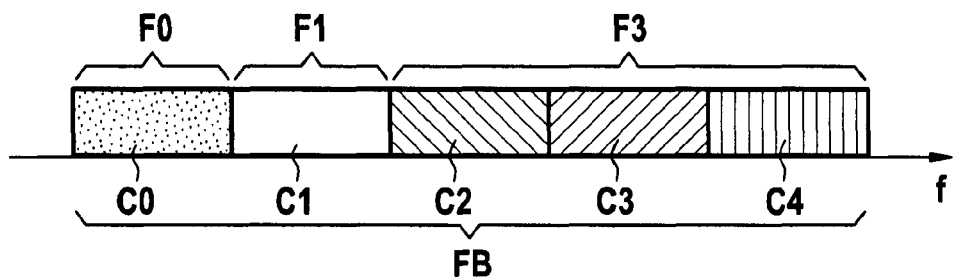
FIG. 3 is a schematic diagram for illustrating an embodiment of the inventive method in the case of additional broadcasting capability.

FIG. 3 shows a schematic diagram for illustrating an embodiment of the inventive method in the case of additional broadcasting capability. FIG. 3 illustrates an extension of frequency domain modulation in accordance with FIG. 2A, wherein the available frequency bandwidth FB has been split into five parts (frequency ranges or carriers) C0-C4. As can be gathered from the hatchings employed in FIG. 3, as before a first part F1 of the spectrum is used for reuse-1 communication, and a second part F3 of the spectrum is used for reuse-3 communication. A third part F0 of the spectrum, which comprises carrier C0 and which is spectrally distinct from said first and second parts F1 and F3, is used for broadcast transmission, i.e., transmitting same signal in different spots or regions of the communication network in synchronous fashion. This feature is also referred to as a single frequency network (SFN). Broadcasting capability requires accurate synchronisation of different base stations, e.g., base station 3 of FIG. 1. GPS (global positioning system), Galileo signals or backhauling signals with proper protocol can be used for this purpose.

As will be described further down with reference to FIG. 6, in accordance with embodiments of the present invention said third part F0 of the spectrum need not be spectrally distinct from said first and second parts F1 and F3, but may at least partly overlap with at least one of said first and second parts.

Providing broadcast capability, as depicted in FIG. 3, circumvents a common disadvantage of standard reuse-3 systems, e.g., WiMAX, and cellular systems in general, wherein broadcasting of audio and video fluxes reveals to be inefficient in terms of power and bandwidth. For instance, if a TV program is broadcasted in reuse-3, it uses a significant amount of radio resources as the content must be repeated in each reuse-3 region or sector (see also FIG. 1), and thus leading to bandwidth inefficiency. Furthermore, said program has to be transmitted with a large amount of power due to interference effects at the cell periphery.

In this way, the embodiment of FIG. 3 comprises synchronised transmission for a certain part F0 of the available spectrum for all cell regions and base stations. For this part of the spectrum and a corresponding transmit (broadcast) time, user terminals 4.1-4.3 within communication network 1 (cf. FIG. 1) combine transmissions of all base stations, e.g., base station 3 (so-called macro diversity). This approach effectively suppresses interference between various cell regions or sectors.

Note that while FIG. 3 illustrates the addition of broadcast capability for the frequency domain modulation case only, a similar approach would be possible for the time domain modulation case as shown in FIG. 2B, as will be appreciated by a person skilled in the art.

An issue with the embodiment of FIG. 3 results in the fact that a user terminal operating under this frequency reuse scheme will require two-carrier capability (dual frequency demodulation capability) in order to be able to receive broadcast information and bi-directional interactive communication (e.g., a phone call) simultaneously. This would lead to rather expensive user terminals and thus may limit practical relevance of the approach depicted in FIG. 3.

In order to address this issue, in a further embodiment in accordance with the pre-sent invention a time dimension is introduced in broadcast carriers, e.g., carrier C0 in FIG. 3. This is schematically illustrated in FIG. 4.

Figure 4:
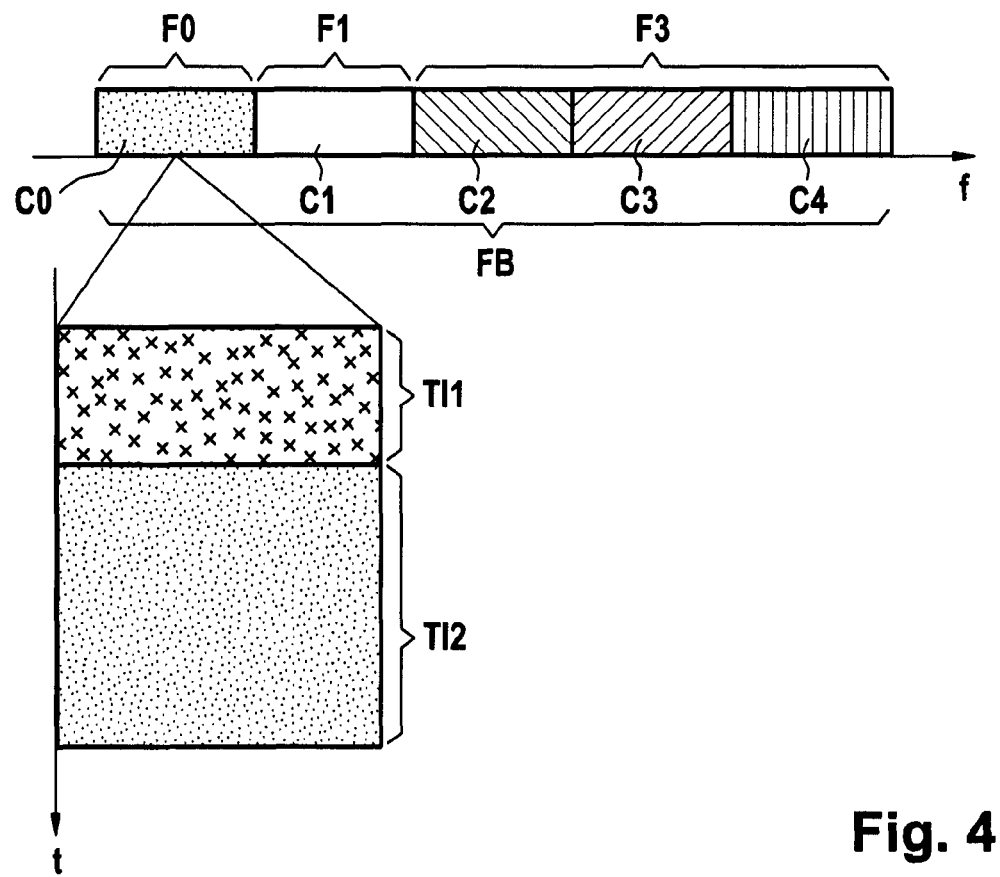
FIG. 4 is a schematic diagram for illustrating an embodiment of the inventive method including broadcasting and interactive communication capability on a common carrier.

FIG. 4 shows a schematic diagram for illustrating an embodiment of the inventive method including broadcasting and interactive communication capability on a common carrier. In FIG. 4, the same reference numerals are used as in FIG. 3 to denote the same or similar elements. In addition to the approach of FIG. 3, in accordance with the embodiment of FIG. 4 broadcast carrier C0 is split up into two time intervals TI1, TI2 with respect to time t. In other word: a time dimension is introduced in broadcast carrier C0. During the first (earlier) time interval TI1 of broadcast carrier C0, paging of user terminals and interactive (bidirectional) communications take place, whereas during the second (later) time interval TI2 synchronised broadcasting of information occurs, as described in detail above. Note that paging and interactive communications as well as broadcasting are implemented on the same carrier C0, thus overcoming the above-mentioned two-carrier capability problem.

In order to further enhance performance of the wireless cellular communication network 1 of FIG. 1, other embodiments in accordance with the present invention propose to make additional use of the joint reuse-1/reuse-3 scheme already described with reference to appended FIG. 1 on a smaller scale in connection with time interval TI1 of broadcast carrier C0 (cf. FIG. 4). This aspect is illustrated in appended FIGS. 5A and 5B.

Figure 5A:
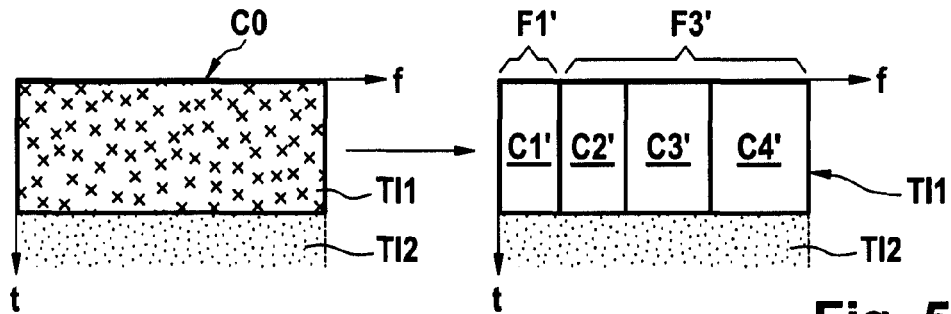
FIGS. 5A, 5B are schematic diagrams for illustrating further embodiments of the method in accordance with the present invention.
Figure 5B:
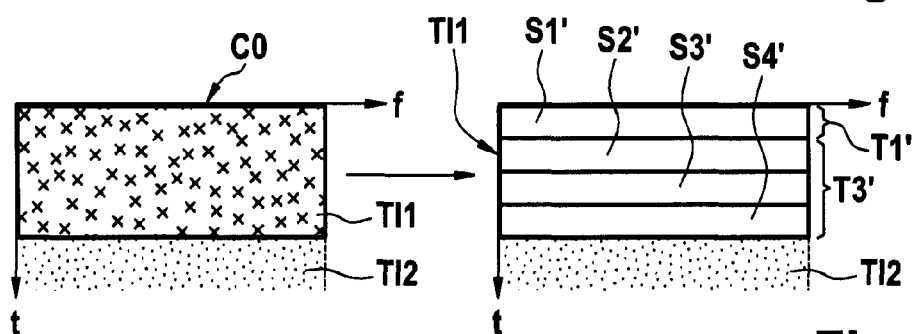

FIGS. 5A and 5B show schematic diagrams for illustrating further embodiments of the method in accordance with the present invention. FIG. 5A shows broadcast carrier C0 having time intervals TI1 and TI2 as described in detail above with reference to FIG. 4. According to the embodiment of FIG. 5A, time interval TI1 is subdivided with respect to frequency f, i.e., split up into a first sub-part F1' and a second sub-part F3' which generally correspond to first and second parts F1, F3 depicted in FIGS. 2A, 3 and 4, respectively. Said first sub-part F1' comprises carrier C1', and second sub-part F3' comprises carriers C2'-C4'. In other words: time interval TI1 of broadcast carrier C0, i.e., the time interval used for paging and interactive communications uses a joint reuse-1/reuse-3 frequency scheme, as described in principle above with reference to appended FIGS. 1 and 2A.

According to FIG. 5B, in analogy with the embodiment of FIG. 2B a time-based joint reuse-1/reuse-3 scheme has been employed to further subdivide time interval TI1 of broadcast carrier C0. In this way, time interval TI1 of broadcast carrier C0, i.e., the time interval used for paging and interactive communications, has been subdivided in a first sub-part T1' and a second sub-part T3', wherein said first sub-part T1' comprises time slot S1' for reuse-1 operation, and said second sub-part T3' comprises time slots S2'-S4' for reuse-3 operation, as explained in principle with reference to appended FIGS. 1 and 2B.

The embodiments of FIGS. 3 to 5B rely on splitting an available spectral bandwidth into five different frequency bands (carrier). However, not all available spectrum allocations do support such an approach. For instance, WiMAX (Worldwide Interoperability for Microwave Access) only has four bands, so that using five bands as in FIGS. 3 to 5B is not easily possible. Appended FIG. 6 shows an embodiment in accordance with the present invention which specifically addresses the above-mentioned issue of a limited number of available frequency bands.

Figure 6:
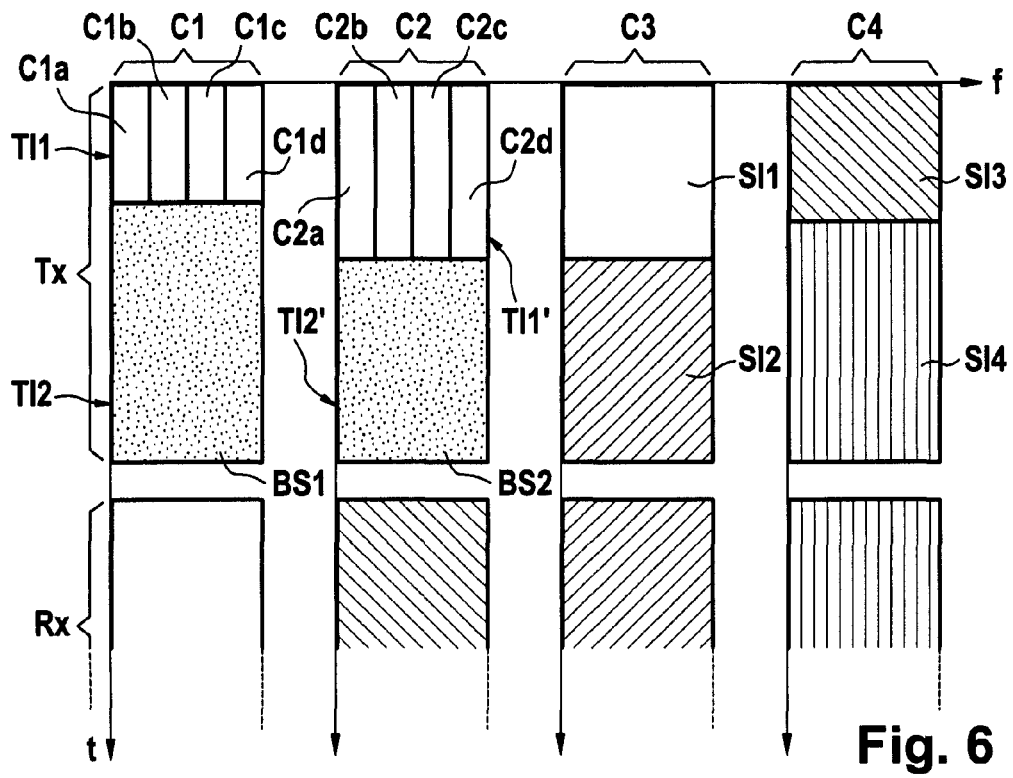
FIG. 6 is a schematic diagram for illustrating an exemplary embodiment of the method in accordance with the present invention in case of a limited number of available carriers.

FIG. 6 shows a schematic diagram for illustrating an exemplary embodiment of the method in accordance with the present invention in case of a limited number of available carriers. FIG. 6 illustrates the exemplary case of WiMAX, which offers only four frequency bands or carriers C1-C4. In order to implement interactive modulations and broadcast, during transmission Tx a time×frequency solution in accordance with the present invention is applied. Note that in FIG. 6, hatchings of different time/frequency slots correspond to those used in connection with already described FIGS. 1 to 5B. As depicted in FIG. 6 (Tx part), there are four t×f slots SI1-SI4 for interactivity, which employ the joint reuse-1/reuse-3 scheme in accordance with embodiments of the present invention. This way illustrates combined splitting of both a frequency bandwidth and a time interval in the context of the proposed joint reuse-1/reuse-3 scheme.

Furthermore, as depicted in FIG. 6, associated with each broadcast slot BS1, BS2, i.e., equivalent to previously described time interval TI2, four t×f slots (within time intervals TI1, TI1') are provided for paging and voice communications, as described further up with reference to appended FIGS. 5A and 5B. Note that said paging and voice communication slots are provided on the same carrier as respective broadcast slots BS1, BS2 (i.e., time intervals TI2, TI2'), i.e., on carriers C1 and C2, respectively. In FIG. 6, said four t×f slots for paging and voice communications are denoted by means of their respective frequencies C1a-C1d and C2a-C2d, respectively. Said frequencies C1a-C1d and C2a-C2d, respectively, follow the same joint reuse-1/reuse-3 pattern as explained above with reference to appended FIGS. 1 and 2A.

As can be gathered from the illustration of FIG. 6, simultaneous two-carrier capability of a user terminal is not required. In other words: Single carrier demodulation can be kept for a given user terminal. In order to change regimes, e.g., to or from broadcast transmission, a simple carrier change is performed. The same technique (e.g., in the form of channel or frequency hopping) may be employed if a given terminal requires continued broadcast or bidirectional communication for larger amounts of data.

During reception (Rx) a general joint reuse-1/reuse-3 scheme in accordance with embodiments of the present invention is employed, as can be gathered from the lower part of FIG. 6.

It will be appreciated by a person skilled in the art, said t×f slots for paging and voice communications depicted in FIG. 6 could alternatively be devised in the form of successive time slots using a single common carrier frequency, as explained above with reference to appended FIG. 5B.

The illustration provided by appended FIG. 6 is equivalent to saying that said third part use for broadcast transmission (cf. FIG. 3) need not be separate from said first and second parts, which are used within the joint reuse-1/reuse-3 scheme in accordance with embodiments of the present invention. As can be gathered from FIG. 6, said third part may also be at least partly overlapping with at least one of said first and second parts.

Figure 7:
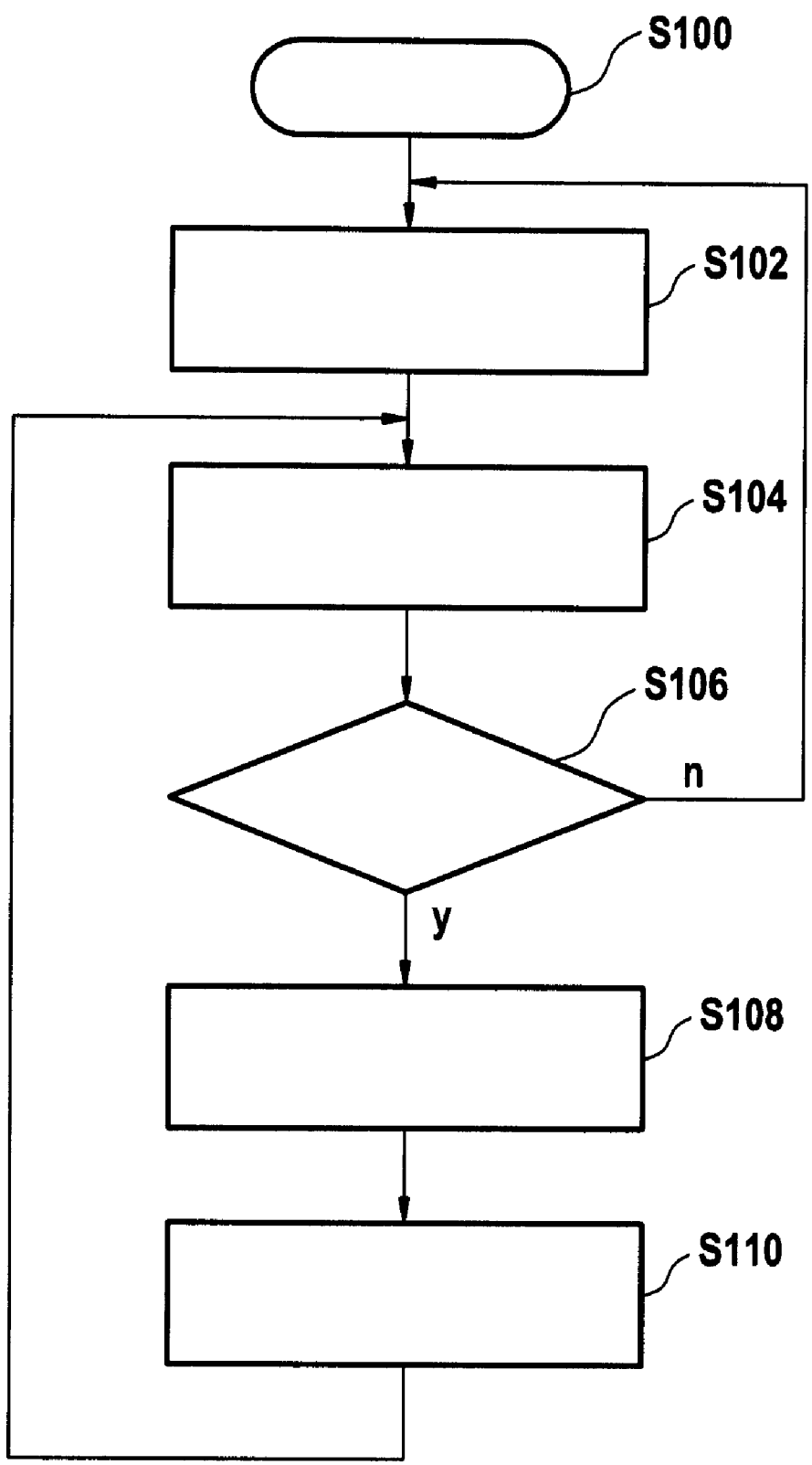
FIG. 7 is a timing diagram for illustrating an embodiment of the method in accordance with the present invention.

FIG. 7 shows a timing diagram for illustrating an embodiment of the method in accordance with the present invention. FIG. 7 is meant to illustrate the aspect of hand-overs between reuse-1 and reuse-3 regions for user terminals which in turn may lead to time-varying shapes and sizes of the respective reuse regions.

The method in accordance with the present invention starts with step S100. In subsequent step 102 communication with a given user terminal is performed either according to a reuse-1 scheme or according to a reuse-3 scheme, e.g., depending on a location of said given user terminal. Referring back to the illustration of FIG. 1, exemplary user terminal 4.1 may initially be located in the peripheral region 2.1*b* of network cell 2.1, so that by way of example communication with said user terminal 4.1 does initially takes place on carrier C3 (reuse-3; cf. FIG. 2A).

In subsequent step S104 user terminal 4.1 measures an SNR or C/I associated with the communication at its present location. In subsequent step S106 it is decided whether or not said measured SNR or C/I is above a corresponding threshold value. In the present exemplary case, if the C/I measured by user terminal 4.1 is above said threshold value, i.e., the question in step S106 is answered in the affirmative (y; low interference), then the user terminal 4.1 is handed over to the central region 2.1*a* of network cell 2.1 for communication on carrier C1 using a reuse-1 scheme (step S108), as described in detail above. Afterwards, in step S110 communication with said user terminal 4.1 is then continued using another reuse scheme, i.e., reuse-1 in the case of the present example. The inventive method then returns to step S104, as previously described.

If the question in step 106 is answered in the negative (n), i.e., the measured value is not above said threshold, then the method continues with step S102. It is equivalent to saying that there is no change in reuse scheme.

Referring back to the embodiment of FIG. 2A, the method illustrated by means of FIG. 7 implies measuring SINR or C/I on two different carriers, i.e., carrier C1 and the respective carrier used in accordance with the reuse-3 scheme for the network cell in question (i.e., carrier C3 in the case of the present example).

Referring back to the embodiment of FIG. 2B, the method illustrated by means of FIG. 7 implies measuring said SINR or C/I values at a single frequency but at different times, i.e., during time slots S1 and S3 in the case of the present example.

If user terminal 4.1 in FIG. 1 measures a C/I value above said threshold value, then by performing step S108 the central region 2.1*a* of network cell 2.1 is effectively enlarged (change in shape and/or size) to encompass the present location of user terminal 4.1.

Figure 8:
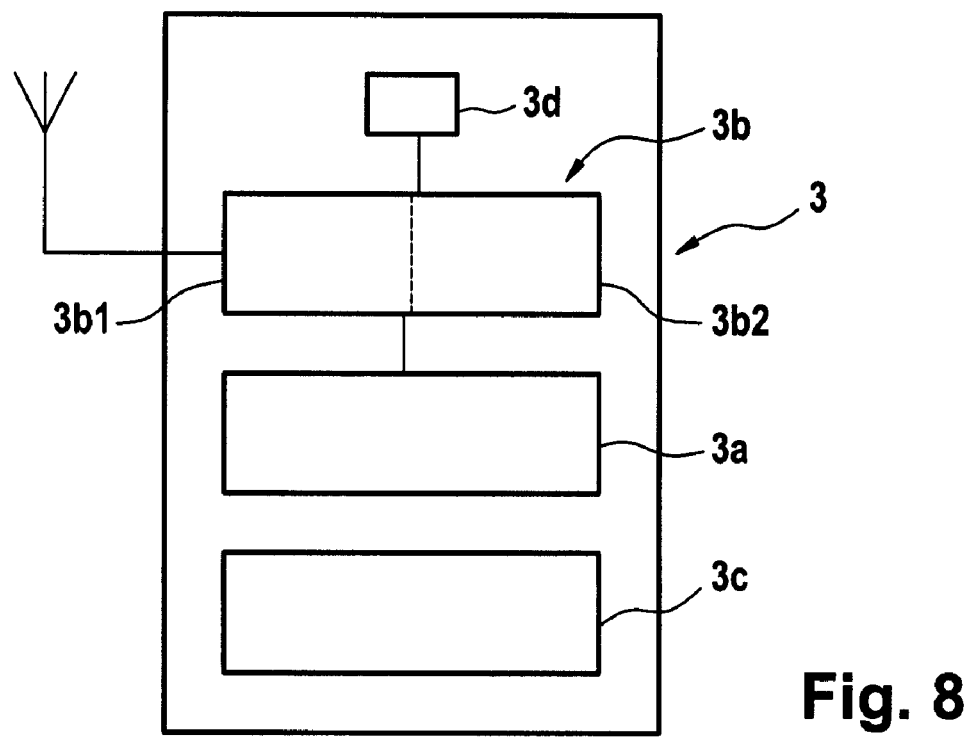
FIG. 8 is a schematic block diagram of an embodiment of a base station in accordance with the present invention.

FIG. 8 shows a schematic block diagram of an embodiment of a base station in accordance with the present invention. The base station 3 of FIG. 8 is intended for use in a wireless serial communication network comprising a number of cells served by respective base stations (cf. FIG. 1). For communicating with a number of user terminals in said communication network in accordance with embodiments of the present invention, base station 3 comprises means 3*a* for splitting at least one of a frequency bandwidth and a time interval allocated for a communication into at least a first part and a second part, as described in detail above with reference to appended FIGS. 1 to 7.

Owing to the action of splitting means 3*a*, communicating means, i.e., transceiving means 3*b* of base station 3 are functionally subdivided in means 3*b*1 for communicating with a first number of user terminals using said first part according to a first reuse scheme and means 3*b*2 for communicating with a second number of user terminals using said second part according to a second reuse scheme, as explained in detail above with reference to appended FIGS. 1 to 7.

Base station 3 further comprises means 3*c* for evaluating SNR or C/I measurements provided by the user terminals and for deciding which reuse schemes should be used for communication with a given user terminal, as described in detail above with reference to appended FIG. 7.

Furthermore, base station 3 comprises either a GPS receiver 3*d* for receiving GPS signals which may be used for synchronised broadcast transmission, as already described in detail above. Alternatively, base station 3 may comprise a box (not shown) connected to the network that performs frequency and time recovery from packet received according a specific protocol (e.g., IEEE 1588).

Figure 9:
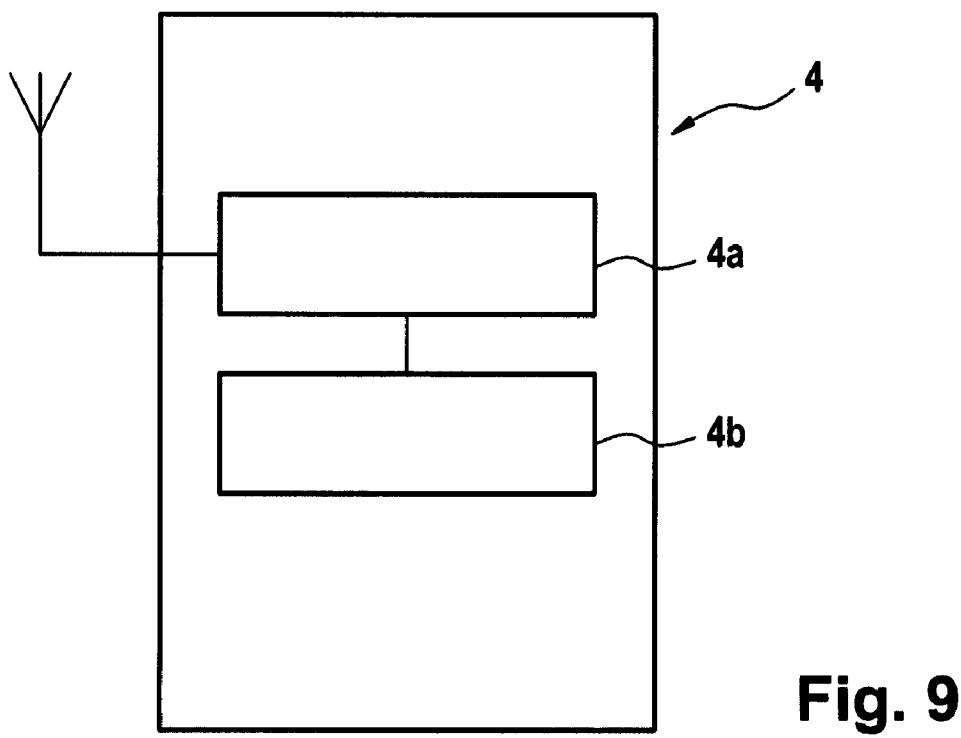
FIG. 9 is a schematic block diagram of an embodiment of a user terminal in accordance with the present invention.

FIG. 9 shows a schematic block diagram of an embodiment of a user terminal in accordance with the present invention. FIG. 9 shows an exemplary user terminal as comprised, e.g., in FIG. 1, which is therefore denoted using a generalised reference numeral 4. The exemplary user terminal 4 of FIG. 9 comprises means 4*a* for receiving and transmitting communication signals over a predefined bandwidth, wherein said bandwidth and/or a time interval allocated to the communication is split into at least two parts, as already explained in detail above. However, as also explained in detail above, a given user terminal 4 does not require two-carrier capability but operates according to single carrier demodulation.

User terminal 4 further comprises means 4*b* for determining at least one respective transmission-related characteristic, e.g., a SINR or C/I value, for transmission to base station 3 (cf. FIG. 8) for deciding on a hand-over between said first and second parts, i.e., said different reuse schemes.

The invention claimed is:

1. A method for communicating in a wireless communication network comprising a number of cells served by respective base stations, comprising the steps of:
    splitting up at least one of a frequency bandwidth and a time interval allocated to the communication in at least a first part and a second part;
    using said first part for communication according to a first reuse scheme;
    using said second part for communication according to a second reuse scheme; and wherein a third part is an allocated bandwidth of said frequency bandwidth,
    wherein use of said third part is split into at least a first time interval and a second time interval and wherein said first time interval is allocated for paging and interactive communication and said second time interval is allocated for broadcast transmission;
    splitting up said first time interval in at least a first sub-part and a second sub-part with respect to one of frequency and time;
    using said first sub-part for communication according to a first sub-part reuse scheme; and
    using said second sub-part for communication according to a second sub-part reuse scheme.

2. The method of claim 1, wherein said first reuse scheme is a reuse-1 scheme and in that said second reuse scheme is a reuse-3 scheme.

3. The method of claim 1, further comprising covering a first region of a given cell using said first reuse scheme and covering a second region of a given cell using said second reuse scheme.

4. The method of claim 1, further comprising performing a hand-over of a user terminal between said first and second parts based on at least one transmission-related characteristic, in particular a signal-to-interference plus noise ratio, SINR, or carrier-to-interference ratio, C/I, determined by said user terminal.

5. The method of claim 1, wherein said third part is different from said first and second parts.

6. The method of claim 1, wherein said third part at least partly overlaps with at least one of said first and second parts.

7. A base station for use in a wireless communication network comprising a number of cells served by respective base stations for communicating with a number of user terminals,
comprising:
means for splitting at least one of a frequency bandwidth and a time interval allocated for the communication in at least a first part and a second part;
means for communicating with a first number of user terminals using said first part according to a first reuse scheme;
means for communicating with a second number of user terminals using said second part according to a second reuse scheme;
wherein a third part is an allocated bandwidth of said frequency bandwidth,
wherein use of said third part is split into at least a first time interval and a second time interval and wherein said first time interval is allocated for paging and interactive communication and said second time interval is allocated for broadcast transmission and
means for:
splitting up said first time interval in at least a first sub-part and a second sub-part with respect to one of frequency and time;
using said first sub-part for communication according to a first sub-part reuse scheme; and
using said second sub-part for communication according to a second sub-part reuse scheme.

8. A user terminal for use in a wireless communication network comprising a number of cells served by respective base stations, wherein
said user terminal comprises:
means for transmitting communications signals over a predefined bandwidth; and means for receiving communication signals over said predefined bandwidth; said means for transmitting and means for receiving communication signals over a predefined bandwidth, being operative such that said bandwidth and/or a time interval allocated to the communication are split into at least two parts, a first part of said two parts being used for communication according to a first reuse scheme, and a second part of said two parts being used for communication according to a second reuse scheme and wherein a third part is an allocated bandwidth of said frequency bandwidth, wherein use of said third part is split into at least a first time interval and a second time interval and wherein said first time interval is allocated for paging and interactive communication and said second time interval is allocated for broadcast transmission; and
means for:
splitting up said first time interval in at least a first sub-part and a second sub-part with respect to one of frequency and time;
using said first sub-part for communication according to a first sub-part reuse scheme; and
using said second sub-part for communication according to a second sub-part reuse scheme.

9. The user terminal of claim 8, comprising:
means for determining at least one respective transmission-related characteristic for deciding on a hand-over between said first and second parts.

* * * * *